July 21, 1959 B. M. BENTON ET AL 2,896,150
FREQUENCY CONTROL DEVICE FOR GENERATORS
Filed Sept. 25, 1958 2 Sheets-Sheet 2

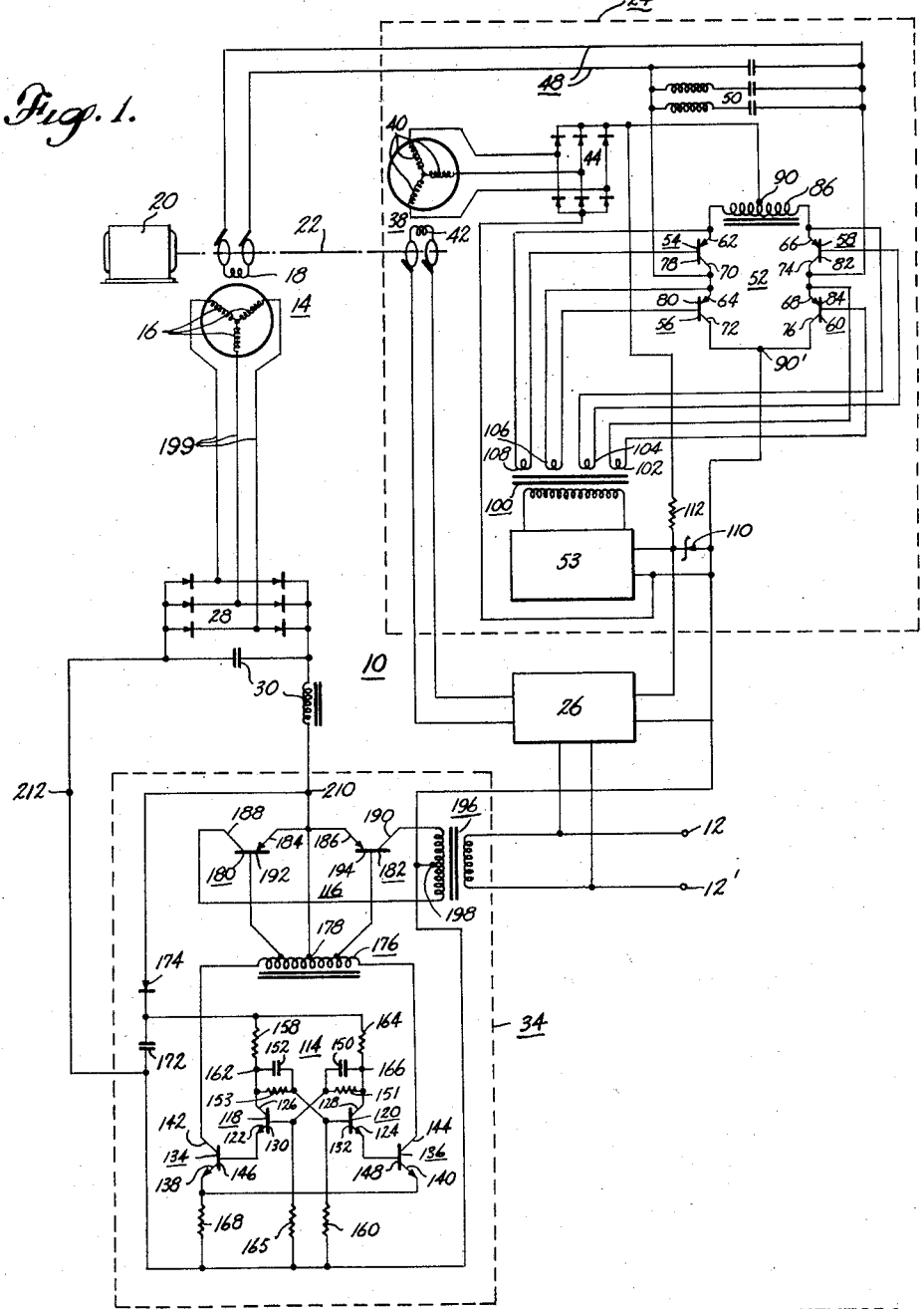

INVENTORS.
BRUCE M. BENTON
RAYMOND P. JUDKINS
BY
ATTORNEY

United States Patent Office 2,896,150
Patented July 21, 1959

2,896,150

FREQUENCY CONTROL DEVICE FOR GENERATORS

Bruce M. Benton, Bellevue, and Raymond P. Judkins, Seattle, Wash., assignors to Boeing Airplane Company, Seattle, Wash., a corporation of Delaware Application September 25, 1958, Serial No. 763,238

5 Claims. (Cl. 322—61)

This invention relates to frequency control devices and more particularly to an electrical control system for maintaining the output voltage of an alternating-current generator at a substantially constant frequency.

Heretofore various means have been provided for maintaining the frequency of the output voltage of an alternating-current generator substantially constant. For instance, all mechanical means associated with only the generator's prime mover has been provided to maintain the speed of the prime mover substantially constant and thus the speed and output frequency of the generator substantially constant. However, this prior art device has the inherent disadvantages of a mechanical system.

The output frequency of a generator has also been controlled by sensing the frequency of the output voltage to obtain a signal for mechanically controlling the speed of the prime mover driving the generator. However, here again mechanical means is involved with its inherent disadvantages. Therefore, it would be desirable to provide an all-electric system for controlling the frequency of the output voltage of a generator without controlling the speed of the prime mover driving the generator.

An object of this invention is to provide a substantially constant frequency alternating voltage derived from an alternating current generator having a variable shaft speed.

Another object of this invention is to provide an all-electric system for effecting a substantially constant frequency alternating voltage derived from an alternating-current generator having a variable shaft speed.

A further object of this invention is to provide a substantially constant frequency alternating voltage derived from an alternating-current generator even though the generator has a relatively high harmonic distortion wave shape.

Another object of this invention is to provide for supplying a substantially constant frequency alternating output voltage from an alternating-current generator with a minimum of filtering at the output, by exciting the field of the generator with a substantially constant frequency alternating-current of substantially sine wave shape.

Other objects of this invention will become apparent from the following description when taken in conjunction with the accompanying drawings in which:

Fig. 1 is a schematic diagram of circuits and apparatus illustrating this invention;

Figure 2A:
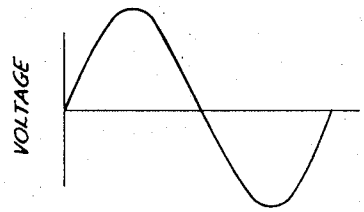
Fig. 2a is a graph illustrating the wave shape of the alternating current supplied to the field winding of the main generator.
Figure 2B:
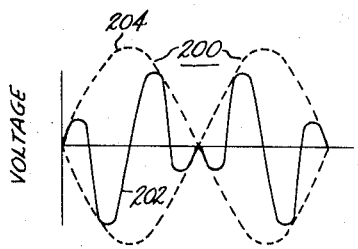
Fig. 2b is a graph illustrating the wave shape of the modulated alternating carrier wave output voltage appearing across the armature windings of the main generator.

Referring to Fig. 1 there is illustrated control means 10 for maintaining the magnitude and frequency of the alternating voltage applied to load terminals 12 and 12' substantially constant. A main alternating-current generator 14 is connected to effect the alternating voltage across the load terminals 12 and 12'. The generator 14 comprises armature windings 16 and a field winding 18 which is disposed to be rotated by means of a prime mover 20 through a mechanical shaft 22.

Figure 2C:
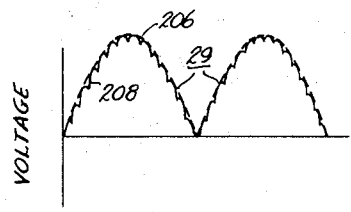
Fig. 2c is a graph illustrating the wave shape of the modulated alternating carrier wave after it has been rectified to produce a pulsating direct-current voltage.
Figure 2D:
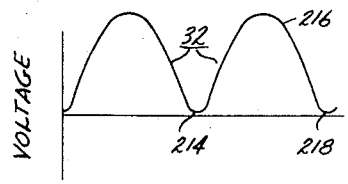
Fig. 2d is a graph illustrating the wave shape of the pulsating direct-current voltage after it has been filtered to remove the relatively high frequency carrier component.
Figure 2E:
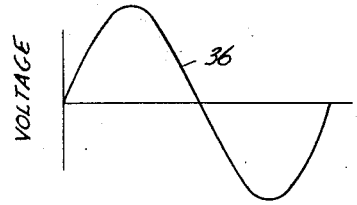
Fig. 2e is a graph illustrating the wave shape of the substantially constant frequency alternating output voltage appearing across the output or load terminals.

In general, the control means 10 comprises control means 24 for supplying substantially constant frequency alternating current to the field winding 18 of the generator 14; a voltage regulator 26 connected to maintain the magnitude of the voltage appearing across the output terminals 12 and 12' substantially constant; a dry-type full-wave rectifier 28, having an input and an output, the input of the rectifier 28 being connected to the armature windings 16 of the generator 14 to effect in operation a pulsating direct-current voltage 29, as illustrated in Fig. 2c, at the output of the rectifier 28; a low pass filter 30 connected to filter the above mentioned pulsating direct-current voltage to effect a filtered direct-current pulsating voltage 32 as shown in Fig. 2d; and an inverter 34 connected to be responsive to the filtered direct-current pulsating voltage 32 to effect across the load terminals 12 and 12' an alternating-current voltage 36, as shown in Fig. 2e, of substanitally constant frequency.

In particular, the control means 24 for supplying substantially constant frequency alternating-current to the field winding 18 of the main generator 14 includes an alternating-current exciter 38 having armature windings 40 and a field winding 42 which is also driven by the shaft 22; a full-wave dry-type rectifier 44 for rectifying the alternating voltage appearing across the armature windings 40 of the exciter 38; an oscillator controlled inverter 46 for inverting the direct-current voltage appearing at the output of the rectifier 44; and circuit means 48, including a filter 50, for applying the substantially constant frequency alternating-current appearing at the output of the oscillator controlled inverter 46 to the field winding 18 of the generator 14.

The oscillator controlled inverter 46 includes a bridge-type transistorized switching circuit 52 and a conventional crystal controlled oscillator 53 which is connected to control the switch rate of the switching circuit 52. In this instance, the switching circuit 52 includes four p-n-p junction type transistors 54, 56, 58 and 60, having emitter electrodes 62, 64, 66 and 68, respectively, collector electrodes 70, 72, 74 and 76, respectively, and base electrodes 78, 80, 82 and 84, respectively. As illustrated, each of the transistors 56 and 60 form one leg of the bridge-type switching circuit 52 while the transistors 54 and 58, in conjunction with a choke 86, form the other two legs of the bridge. In operation, the choke 86 functions to smooth switching transients in the switching circuit 52 and thus rounds off the corners of the alternating square wave voltage appearing at the output terminals 88 and 88' of the bridge-type switching circuit 52. This minimizes the amount of filtering to be done by the filter 50.

As illustrated, the output of the rectifier 44 is electrically connected to the input terminals 90 and 90' of the bridge-type switching circuit 52 while the output terminals 88 and 88' of the switching circuit 52 are electrically connected to the filter 50 which in turn is electrically connected to the field winding 18 of the main generator 14.

As hereinbefore mentioned, the switching rate of the switching circuit 52 is controlled by the oscillator 53. In order to accomplish this, a signal transformer 100 is interconnected between the oscillator 53 and the switching circuit 52. Specifically, the signal transformer 100 includes a secondary winding 102 which is electrically connected between the emitter electrode 68 and the base electrode 84, of the transistor 60, to control the conductivity of the transistor 60; a secondary winding 104 which is electrically connected between the emitter electrode 66 and the base electrode 82, of the transistor 58, to control the conductivity of the transistor 58; a secondary winding 106 which is electrically connected between the emitter electrode 64 and the base electrode 80, of the transistor 56, to control the conductivity of the transistor 56; and a secondary winding 108 which is electrically connected between the emitter electrode 62 and the base electrode 78, of the transistor 54, to control the conductivity of the transistor 54. As will be explained more fully hereinafter, the polarity of the voltages across the secondary windings 102, 104, 106 and 108, of the signal transformer 100, are such as to render during one half-cycle of operation the transistors 56 and 58 conductive and the transistors 54 and 60 non-conductive and to render during the next half-cycle of operation the transistors 54 and 60 conductive and the transistors 56 and 58 non-conductive.

As illustrated, the output of the rectifier 44 is electrically connected to both the input of the oscillator 53 and the input of the voltage regulator 26. However, in order to regulate the magnitude of this direct-current voltage applied to the inputs of the oscillator 53 and the regulator 26 a Zener diode 110 and a resistor 112 are provided.

Referring more specifically to the inverter 34, the inverter 34 comprises a conventional flip-flop circuit or count of two counter 114 which is responsive to the filtered pulsating direct-current voltage 32 to effect an alternating voltage of substantially constant frequency, and a transistorized current amplifier 116, responsive to the latter mentioned substantially constant frequency alternating voltage, for effecting the substantially constant frequency alternating voltage across the load terminals 12 and 12'. In particular, the flip-flop circuit 114 includes two control n-p-n junction type transistors 118 and 120 which have emitter electrodes 122 and 124, respectively, collector electrodes 126 and 128, respectively, and base electrodes 130 and 132, respectively; and two current amplifier n-p-n junction type transistors 134 and 136 which are connected to amplify the current output from the respective control transistors 118 and 120. The transistors 134 and 136 include emitter electrodes 138 and 140, respectively, collector electrodes 142 and 144, respectively, and base electrodes 146 and 148, respectively.

In order to render the transistor 118 non-conductive after it has been conductive for a predetermined time a parallel circuit including a capacitor 150 and a resistor 151 is interconnected between the base electrode 130, of the transistor 118, and the collector electrode 128, of the transistor 120. In like manner, in order to render the transistor 120 non-conductive once it has been conductive for a predetermined time a parallel circuit including a capacitor 152 and a resistor 153 is electrically interconnected between the collector electrode 126, of the transistor 118, and the base electrode 132, of the transistor 120.

The series circuit including a resistor 158, the resistor 153 and as resistor 160 functions as a voltage divider to obtain the proper voltage at points 162 and 163. In like manner a resistor 164, the resistor 151 and a resistor 165 functions as a voltage divider to obtain the proper voltage at points 166 and 167. For the purpose of obtaining inverse bias for the transistors 118, 120, 134 and 136 an inverse bias resistor 168 is provided.

In order to prevent the capacitor 150 from rendering the transistor 118 non-conductive before the voltage wave 32 reaches its minimum value and for preventing the capacitor 152 from rendering, during the next half-cycle of operation, the transistor 120 non-conductive before the voltage wave 32 reaches its minimum value, a capacitor 172 is connected to control the magnitude of the voltages applied to the base electrodes 130 and 132 of the transistors 118 and 120, respectively. A blocking rectifier 174 is disposed to force the discharge of the capacitor 172 into the flip-flop circuit 114 rather than back into the filter 30.

For the purpose of providing an alternating control voltage for the current amplifier 116 that is in accordance with the operation of the flip-flop circuit 114 an autotransformer 176, having a center tap 178, is provided.

Referring in particular to the current amplifier 116, the amplifier 116 includes two p-n-p junction type transistors 180 and 182 having emitter electrodes 184 and 186, respectively, collector electrodes 188 and 190, respectively, and base electrodes 192 and 194, respectively. In order to control the conductivity of the transistor 180 in accordance with the voltage across the autotransformer 176 the center tap 178, of the autotransformer 176, is electrically connected to the emitter electrode 184, and the left end of the autotransformer 176, as shown, is electrically connected to the base electrode 192, of the transistor 180. In like manner, in order to control the conductivity of the transistor 182 in accordance with the voltage across the autotransformer 176, the center tap 178 is electrically connected to the emitter electrode 186 and the right end of the autotransformer 176, as shown, is electrically connected to the base electrode 194, of the transistor 182. However, for the purpose of effecting an alternating voltage across the load terminals 12 and 12' in accordance with the conductivity of the transistors 180 and 182, a voltage transformer 196, having a center tap 198, is provided.

The operation of the circuits and apparatus shown in Fig. 1 will now be described. Assuming the prime mover 20 is driving the shaft 22 and thus effecting a rotation of the field winding 42, of the exciter 38, then an alternating voltage appears across the armature windings 40, of the exciter 38. The alternating voltage appearing across the armature windings 40 is rectified by the rectifier 44 and a direct-current voltage is applied to the input terminals 90 and 90' of the switching circuit 52. Assuming further that the polarity of the voltages across the secondary windings 102, 104, 106, 108, of the signal transformer 100, is such that the emitter electrode 68, of the transistor 60, is negative with respect to its associated base electrode 84, that the emitter electrode 66, of the transistor 58, is positive with respect to its associated base electrode 82, that the emitter electrode 64, of the transistor 56, is positive with respect to its associated base electrode 80, and that the emitter electrode 62, of the transistor 54, is negative with respect to its associated base electrode 78, then the transistors 56 and 58 are conductive and the transistors 54 and 60 are non-conductive. Under such a condition current flows from the positive side of the output of the rectifier 44 through the right portion of the choke 86, as shown, the emitter electrode 66, of the transistor 58, the collector electrode 74, the field winding 18, of the generator 14, the emitter electrode 64, of the transistor 56, and the collector electrode 72, to the negative side of the output of the rectifier 44.

During the next half-cycle of operation the polarity of the voltages across the secondary windings 102, 104, 106, and 108, of the transformer 100, reverses to thereby render the transistors 54 and 60 conductive and the transistors 56 and 58 non-conductive. When the transistors 54 and 60 are conductive, current flows from the positive side of the output of the rectifier 44 through the left portion of the choke 86, as shown, the emitter electrode 62, of the transistor 54, the collector electrode 70, the field winding 18, of the generator 14, the emitter electrode 68, of the transistor 60, and the collector electrode 76, to the negative side of the output of the rectifier 44.

Thus, alternating current flows from the output of the switching circuit 52 and the filter 50 through the field winding 18, and since the switching rate of the switching circuit 52 is controlled in accordance with the crystal oscillator 53, having a substantially constant frequency, the frequency of the alternating current flowing through the field winding 18, of the generator 14, is likewise substantially constant. Owing to the filtering action of the filter 50 the alternating current flowing through the field winding 18 is also of substantially sine wave shape. Thus, the magnitude of the flux in the field magnetic circuit and in the air gap of the main generator 14 varies approximately sinusoidally. The voltage generated across the armature winding 16, of the generator 14, is proportional to the magnetic flux and also to the speed of rotation of the shaft 22 and the field winding 18. If the speed of rotation of the shaft 22 and the number of poles of the generator 14 are such that the frequency that would be generated if direct-current excitation were applied to the field winding 18 is appreciably higher than the alternating-current field excitation frequency that is actually applied to the field winding 18, then a modulated alternating carrier wave output voltage of a wave shape as indicated at 200 is generated across each of the armature windings 16, of the main three-phase synchronous generator 14 and also between each of the output leads 199.

The modulated wave 200 comprises an alternating carrier wave 202 the frequency of which varies in accordance with the rotational speed of the shaft 22. However, the modulation frequency as represented by the wave 204 remains substantially constant irrespective of the the speed of rotation of the shaft 22 since the modulation frequency is controlled by the frequency of the alternating-current supplied to the field winding 18, of the generator 14, the frequency of which current is maintained substantially constant. In practice, a carrier frequency of approximately four to ten times the modulation frequency is satisfactory.

The modulated alternating carrier wave output voltage 200 is rectified by the rectifier 28 to thus effect the pulsating direct-current voltage 29 shown in Fig. 2c. As illustrated, the pulsating voltage 29 includes a component 206 which is pulsating at twice the modulation frequency of the modulated wave 200. However, the pulsating direct-current voltage 29 also includes a component 208 which is pulsating at six times the rate of the carrier frequency.

The pulsating direct-current voltage 29 is then filtered by the low pass filter 30 which smoothes out the component 208 of the pulsating voltage 29 that is pulsating at six times the rate of the carrier frequency, to thus effect the filtered pulsating direct-current voltage 32, as shown in Fig. 2d.

As hereinbefore mentioned, the flip-flop circuit 114 is responsive to the filtered direct-current pulsating voltage 32. Specifically, assuming that the transistors 118 and 134 are conductive, then current flows from a point 210 at the output of the filter 30 through the blocking rectifier 174, in the forward direction, the resistor 158, the capacitor 152, and the resistor 160, to a point 212 at the output of the filter 30. Simultaneously current also flows from the point 210 through the blocking rectifier 174, in the forward direction, the resistor 164, the capacitor 150, the base electrode 130, of the transistor 118, the emitter electrode 122, the base electrode 146, of the transistor 134, the emitter electrode 138, and the bias resistor 168, to the point 212. The capacitor 150 assumes a larger charge on it than the charge assumed on the capacitor 152 since the voltage across the resistor 151 is larger than the voltage across the resistor 153. Finally when the point 214 of the wave 32 is reached the point 163 becomes more positive than the point 167 due to the action of the capacitors 150 and 152, and at that instant the transistors 120 and 136 become conductive and the transistors 118 and 134 become non-conductive. However, before the transistor 118 is rendered non-conductive current simultaneously flows from the point 210 through the left portion of the autotransformer 176, as shown, the collector electrode 142, of the transistor 134, the emitter electrode 138, and the bias resistor 168, to the point 212. This latter action causes control current to flow from the center tap 178, of the autotransformer 176, through the emitter and base electrodes 184 and 192, of the transistor 180, to thus render the transistor 180 conductive. With the transistor 180 conductive current simultaneously flows from the point 210 through the emitter and collector electrodes 184 and 188, of the transistor 180, and the center tap 198, of the transformer 196, to the point 212, to thereby effect a voltage across the load terminals 12 and 12'.

The next succeeding pulsation 216 of the pulsating direct-current voltage 32 flows from the point 210 through the blocking rectifier 174, in the forward direction, the parallel circuit, one branch of which includes the resistor 158, the capacitor 152, the base electrode 132, of the transistor 120, the emitter electrode 124, the base electrode 148, of the transistor 136, the emitter electrode 140, and the bias resistor 168, and the other branch of which includes the resistor 164, the capacitor 150, and the resistor 165, to the point 212. With the transistor 120 conductive current also flows from the point 210 through the blocking rectifier 174, in the forward direction, the resistor 164, the collector electrode 128, of the transistor 120, the emitter electrode 124, the base electrode 148, of the transistor 136, the emitter electrode 140, and the bias resistor 168, to the point 212. Simultaneously, current flows from the point 210, through the right portion of the autotransformer 176, as shown, the collector electrode 144, of the transistor 136, the emitter electrode 140, and the bias resistor 168, to the point 212. This latter current flow effects a flow of control current from the center tap 178, of the autotransformer 176, through the emitter electrode 186, of the transistor 182, and the base electrode 194, to the right end of the autotransformer 176, as shown, to thereby render the transistor 182 conductive. With the transistor 182 conductive current flows from the point 210 through the emitter electrode 186, of the transistor 182, the collector electrode 190, and the center tap 198, of the transformer 196, to the point 212, to thus effect a voltage of opposite polarity across the output or load terminals 12 and 12'.

During this latter half-cycle of operation the capacitor 152 assumes a higher charge on it than the charge assumed on the capacitor 150 since the voltage across the resistor 153 is larger than the voltage across the resistor 151. Finally when the point 218 of the wave 32 is reached the point 167 becomes more positive than the point 163 due to the action of the capacitors 150 and 152, and at that instant the transistors 118 and 134 become conductive and the transistors 120 and 136 become non-conductive. The cycle of operation as hereinbefore described is then repeated.

In operation, the voltage regulator 26 senses the alternating output voltage appearing across the output terminals 12 and 12' and effects a change in the magnitude of the direct current flowing through the field winding 42 of the exciter 38. A change in the magnitude of the direct current flowing through the field winding 42 effects a change in the magnitude of the alternating output voltage across the armature windings 40, of the exciter 38, to thereby effect a change in the magnitude of the alternating-current flowing through the field winding 18 of the generator 14. This in turn changes the magnitude of the voltage appearing across the armature windings 16, of the generator 14, to thereby change the magnitude of the current flowing through the transistors 180 and 182, to thus restore the magnitude of the alternating voltage appearing across the output terminals 12 and 12' to the regulated value.

It is to be understood that a brushless type of alternator such as a flux switching type of alternator could be substituted for the main generator 14.

The apparatus embodying the teachings of this invention has several advantages. For instance, an alternating voltage of substantially constant frequency can be produced across the output terminals 12 and 12' even though the main generator 14 has a relatively high harmonic distortion wave shape. In addition, since the pulsating direct-current voltage 32 is not of a square wave shape but rather is rounded, no filtering is required at the output terminals 12 and 12' in order to obtain an alternating voltage of substantially sine wave shape. Further, the control means 10 for maintaining an alternating voltage of substantially constant frequency across the output terminals 12 and 12' comprises all electrical components.

Since numerous changes may be made in the above apparatus and circuits and different embodiments may be made without departing from the spirit and scope thereof, it is intended that all matter contained in the foregoing description or shown in the accompanying drawings shall be interpreted as illustrative and not in a limiting sense.

We claim as our invention:

1. In means for obtaining a substantially constant frequency alternating voltage, the combination comprising, an alternating-current generator having a field winding and an armature winding, means for supplying substantially constant frequency alternating current to said field winding to effect a modulated alternating carrier wave output voltage across said armature winding during operation of said generator, a rectifier connected to rectify said output voltage to effect a pulsating direct-current voltage, and an inverter connected to invert said pulsating direct-current voltage, to thereby effect said constant frequency alternating voltage.

2. In means for obtaining a substantially constant frequency alternating voltage, the combination comprising, an alternating-current generator having a field winding and an armature winding, means for supplying substantially constant frequency alternating current of substantially sine wave shape to said field winding to effect a modulated alternating carrier wave output voltage across said armature winding during operation of said generator, a rectifier connected to rectify said output voltage to effect a pulsating direct-current voltage, a low pass filter connected to filter said pulsating direct-current voltage to obtain a filtered direct-current pulsating voltage, and an inverter connected to invert said filtered pulsating direct-current voltage, to thereby effect said constant frequency alternating voltage.

3. In means for obtaining a substantially constant frequency alternating voltage, the combination comprising, an alternating-current generator having a field winding and an armature winding, means for supplying substantially constant frequency alternating current of substantially sine wave shape to said field winding to effect a modulated alternating carrier wave output voltage across said armature winding during operation of said generator, a rectifier having an input and an output, the input of said rectifier being connected to said armature winding so as to effect a pulsating direct-current voltage at the output of said rectifier, a low pass filter connected to filter said pulsating direct-current voltage to obtain a filtered direct-current pulsating voltage, a flip-flop circuit responsive to said filtered direct-current pulsating voltage to effect an alternating output voltage, and an amplifier connected to be responsive to said alternating output voltage.

4. The combination comprising, a main alternating-current generator having a field winding and an armature winding, means for supplying a substantially constant frequency alternating current to said field winding, said means including an alternating-current exciter having a field winding and an armature winding, an oscillator controlled inverter having an input and an output, circuit means for rectifying the alternating voltage appearing across the armature winding of the exciter and applying the resulting direct-current voltage to the input of said inverter, and other circuit means for interconnecting the output of said inverter with the field winding of said main generator to effect a modulated alternating carrier wave output voltage across the armature winding of said main generator during operation of said main generator, a rectifier connected to rectify the modulated alternating carrier wave output voltage to effect a pulsating direct-current voltage, and another inverter connected to invert said pulsating direct-current voltage.

5. The combination comprising, a main alternating-current generator having a field winding and an armature winding, means for supplying a substantially constant frequency alternating current to said field winding, said means including an alternating-current exciter having a field winding and an armature winding, an oscillator controlled inverter having an input and an output, circuit means for rectifying the alternating voltage appearing across the armature winding of the exciter and applying the resulting direct-current voltage to the input of said inverter, and other circuit means for interconnecting the output of said inverter with the field winding of said main generator to effect a modulated alternating carrier wave output voltage across the armature winding of said main generator, a rectifier having an input and an output, the input of said rectifier being connected to the armature winding of said main generator so as to effect a pulsating direct-current voltage at the output of said rectifier, a low pass filter connected to filter said pulsating direct-current voltage to obtain a filtered direct-current pulsating voltage, a flip-flop circuit responsive to said filtered direct-current pulsating voltage to effect an alternating output voltage, and an amplifier connected to be responsive to said alternating output voltage.

No references cited.